(12) United States Patent
Bosisio et al.

(10) Patent No.: US 7,386,208 B2
(45) Date of Patent: Jun. 10, 2008

(54) SUBMARINE OPTICAL CABLE WITH WATER-BLOCKING FILLING COMPOSITION

(75) Inventors: Claudio Bosisio, Brembata (IT); Massimillano Pavan, Verdello (IT); Mauro Maritano, Monza (IT)

(73) Assignee: Prysmian Cavi e Sistemi Energia S.R.L., Milan (IT)

( * ) Notice: Subject to any disclaimer, the term of this patent is extended or adjusted under 35 U.S.C. 154(b) by 223 days.

(21) Appl. No.: 10/451,952

(22) PCT Filed: Dec. 14, 2001

(86) PCT No.: PCT/EP01/15409

§ 371 (c)(1),
(2), (4) Date: Jan. 14, 2004

(87) PCT Pub. No.: WO02/054131

PCT Pub. Date: Jul. 11, 2002

(65) Prior Publication Data

US 2004/0105634 A1    Jun. 3, 2004

Related U.S. Application Data

(60) Provisional application No. 60/259,219, filed on Jan. 3, 2001.

(30) Foreign Application Priority Data

Dec. 28, 2000   (EP)   ................................ 00128592

(51) Int. Cl.
    *G02B 6/44* (2006.01)
(52) U.S. Cl. ...................................... 385/102; 385/109
(58) Field of Classification Search ................ 385/102, 385/109
See application file for complete search history.

(56) References Cited

U.S. PATENT DOCUMENTS

| 3,714,110 A | 1/1973 | Verdol et al. |
| 4,168,258 A | 9/1979 | Brauer et al. |
| 4,684,213 A | 8/1987 | Ishihara et al. |

(Continued)

FOREIGN PATENT DOCUMENTS

EP    0 517 287 A2    12/1992

OTHER PUBLICATIONS

"Standard Method of Test for Penetration of Bituminous Materials"; ASTM Designation: D 5-65, American National Standard A37, 1-1967, American National Standards Institute; American Association State Highway Officials Standard AASHO No. T 49, pp. 5-9, (1965).

*Primary Examiner*—Michelle Connelly-Cushwa
*Assistant Examiner*—Jerry T Rahll
(74) *Attorney, Agent, or Firm*—Finnegan, Henderson, Farabow, Garrett & Dunner, L.L.P.

(57) ABSTRACT

Optical cable, in particular for submarine connections. A water blocking resin filling composition of reduced hardness is disposed into interstices. Preferably, the resin composition is a polyurethane resin having less than about 35% by weight of a polyol/polyisocyanate mixture and about 60% to about 90% by weight of a mineral oil. The polyurethane resin preferably has less than about 12% by weight of a coupling agent. The cable has an optical core surrounded by a plurality of metallic wires and an outer polymeric sheath. The optical core is of the "tight" type with a plurality of optical fibers embedded into a polymeric matrix disposed around a strength member.

12 Claims, 1 Drawing Sheet

U.S. PATENT DOCUMENTS 4,726,649 A * 2/1988 Funaki et al. ............... 385/109
5,125,062 A 6/1992 Marlier et al.
5,402,516 A * 3/1995 Blyler et al. ................ 385/141

* cited by examiner

SUBMARINE OPTICAL CABLE WITH WATER-BLOCKING FILLING COMPOSITION

CROSS REFERENCE TO RELATED APPLICATIONS

This application is a national phase application based on PCT/EP01/15409, filed Dec. 14, 2001, the content of which is incorporated herein by reference, and claims the priority of European Patent Application No. 00128592.3, filed Dec. 28, 2000, and claims the benefit of U.S. Provisional Application No. 60/259,219, filed Jan. 3, 2001.

BACKGROUND OF THE INVENTION

1. Field of The Invention

The present invention relates to a submarine optical cable comprising a polymeric composition suitable for filling the interstices within said cable, in order to control a longitudinal flow of water accidentally penetrated inside said cable.

2. Background Art

Submarine optical cables are subjected, in case of accidental rupture thereof, to a sudden ingress of a sea-water flow at high pressure (e.g. 100 bar, when the cable is at 1000 m below the sea level). Such high pressure water flow may propagate for a relevant length inside the cable if suitable water blocking means are not provided in the cable, thus damaging a remarkable portion of said cable which has then to be replaced.

A number of cables designed for submarine installation are known in the art.

For instance, U.S. Pat. No. 4,684,213 relates to a submarine cable comprising a pressure resistant steel tube containing optical fibers, surrounded by two layers of steel wires and by an outer metal tube made of copper or aluminum. Dams of a sticky compound and/or of a jelly of plastic material are disposed at regular intervals inside the central tube and in the gaps between the lay of wires disposed between the central tube and the outer tube.

U.S. Pat. No. 5,125,062 discloses an undersea cable comprising a central metallic tube, filled with a sealing compound, e.g. silica gel, and containing optical fibers embedded therein, said tube being surrounded by a helical lay of metallic (preferably steel) wires. Interstices between wires and between the helical lay and the central tube are filled with a sealing material, such as a polyurethane resin, which opposes longitudinal propagation of water along the cable. Alternatively, the central tube can be made of plastic and in this case the helical lay also presents the characteristics of an arch for withstanding pressure.

U.S. Pat. No. 4,726,649 relates to a submarine cable wherein the voids inside the cable are filled with a material having adequate elongation property and creep characteristics, in order to withstand the high pressure water flow following an accidental rupture of the cable. As filling material, a polyurethane resin is disclosed, said resin being comprised of not less than 10% by weight, preferably not less than 30% by weight of a hydrocarbon polyol/polyisocyanate mixture and from about 5 to 90%, preferably from 10% to 70% of a hydrocarbon oil. In the working examples a paraffinic oil is employed as a mineral oil, in a maximum amount of 56% by weight.

The applicant has now observed that while prior art resin filling compositions, in particular polyurethane based resins, has been developed with selected mechanical characteristics allowing the resin to effectively block the longitudinal water flow inside a submarine cable, (e.g. following an accidental rupture of the same), no attention has been paid in the prior art cables to the mechanical interaction between the filling compositions and the optical fibers disposed inside the optical core.

The Applicant has in fact observed that commercial polyurethane-based filling composition, when cross-linked, reach a relative high hardness. The Applicant has further observed that mechanical stresses can be generated in the cable structure, in particular during the manufacturing process of the cable, such as during the stranding of metal armoring wires around the optical core (e.g. as a consequence of a slight variations in the circular cross-section of the stranded metallic wires). Due to the relatively high hardness of the resin filling material disposed around the optical core, said mechanical stresses can be transmitted onto the optical core, thus causing a permanent deformation on the structure of the same, with consequent possible attenuation of the signal transmitted by the optical fiber contained therein.

Applicant has noticed that this problem becomes much more relevant when Large Effective Area (LEA) fibers are used in the optical cable, which fibers are much more sensitive to bending-induced losses (also known as the microbending and macrobending phenomena) than standard dispersion-shifted fibers (SDS fibers). The term LEA fibers is intended to encompass those optical fibers having a large effective area, in particular optical fibers having an effective area of at least 7 $\mu m^2$ or greater. In particular, said LEA fibers may be used in wavelength-division-multiplexing (WDM) and high bandwidth systems.

The Applicant has now observed that the resin filling material, while being capable of guaranteeing the desired water-blocking performances, shall have at the same time a relatively reduced hardness, in order not to negatively affect the signal transmission within the optical fiber in case of mechanical stresses produced onto the cable, and particularly onto the optical core.

The Applicant has further observed that certain components of conventional polyurethane resins may negatively interact with some material forming the structural elements of the cable. In particular, ester compounds which may be used as plasticizers in conventional polyurethane resin composition may negatively interact with the polymeric material of the optical core of submarine cables. The Applicant has thus found that by suitably formulating a polyurethane resin composition, in particular by using a relatively high amount of mineral oil and a rather limited amount of ester compounds, it is possible to obtain a good compatibility between the polyurethane resin and other polymeric materials of the cable.

SUMMARY OF THE INVENTION

One aspect of the present invention thus relates to an optical cable comprising:
  an outer sheath;
  an optical core disposed within said outer sheath, said optical core comprising at least one optical fiber housed therein;
  at least one longitudinal cavity disposed along and in contact with the optical core; wherein said at least one longitudinal cavity is at least partially filled with a resin material having a needle penetration higher than about 200 1/10 mm, measured according to ASTM D 5-65.

Preferably, said resin material has a needle penetration higher than about 240 1/10 mm.

Preferably, said resin is a polyurethane-based resin.

According to a preferred embodiment, said optical core comprises at least one optical fiber embedded into a matrix of polymeric material.

According to a preferred aspect, the present invention relates to an optical cable comprising:
- an outer sheath;
- an optical core disposed within said outer sheath, said optical core comprising at least one optical fiber housed therein;
- at least one longitudinal cavity disposed along and in contact with said optical core; wherein said at least one longitudinal cavity is at least partially filled with a polyurethane resin obtainable from a liquid curable composition comprising less than about 35% by weight of a polyol/polyisocyanate mixture and from about 65% to about 90% by weight of a mineral oil.

Preferably, the amount of the polyol/polyisocyanate mixture in said liquid curable composition is from about 10% to about 30% by weight, more preferably from about 15% to about 25%.

Preferably, said polyol/polyisocyanate mixture comprises from about 60% to about 85%, more preferably from about 65% to about 80% of a polyol and from about 15% to about 40%, preferably from about 20% to about 35% by weight of a polyisocyanate.

Preferably, the amount of mineral oil in said liquid curable composition is from about 65% to about 85%, more preferably from about 68% to about 80% by weight.

Preferably, said liquid curable composition further comprises less than about 12% by weight of a coupling agent, more preferably less than about 8%.

DESCRIPTION OF PREFERRED EMBODIMENTS

Figure 1:
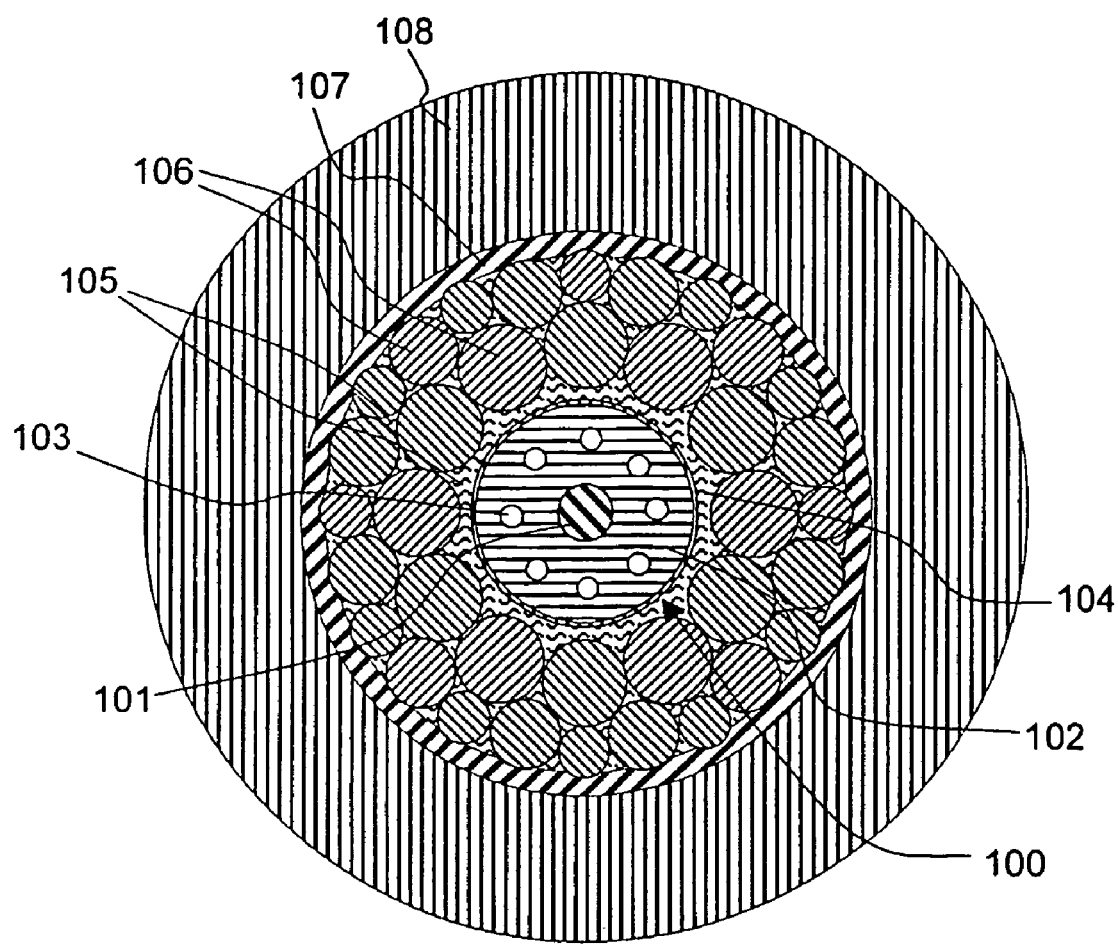
FIG. 1 shows a transversal cross section of a cable according to the invention.

The cable illustrated in FIG. 1 is a submarine optical cable comprising an optical core 100 surrounded by plurality of metallic wires 106 (made of e.g. galvanized steel), said metallic wires being disposed in a helical lay around said optical core and presenting the characteristics of an arch for withstanding pressure. Preferably, as shown in FIG. 1, said metallic wires are disposed in two superposed layers around the optical core.

A metal sheath 107 (e.g. of copper) is then formed around the helical lay of metal wires for hermetically protecting the optical core from radial ingress of water or humidity.

An outer polymeric sheath 108, made for instance from polyethylene, e.g. high or medium density polyethylene, is disposed to surround the metal sheath.

In particular, the optical core 100 illustrated in FIG. 1 is of the "tight" type, wherein a plurality of optical fibers 103 is embedded into a polymeric matrix 102 disposed around a strength member 101. The strength member 101 may, for instance, be a wire of steel or resin reinforced with glass fibres, suitable reinforcing polymeric materials (such as aromatic polyamides, for example Kevlar®), carbon fibres or the like. Examples of polymers suitable for forming the polymeric matrix 102 are thermoplastic resins. Preferably an elastomeric polyester is used, such as the one marketed under the trade name Hytrel® by Du Pont, for example Hytrel® 4056, 3548 L or G3548W. The optical fibers embedded into the polymeric matrix are conventional optical glass fiber with a conventional polymeric coating, e.g. of UV cured acrylate. Preferably said fibers are LEA fibers, which are particularly suitable for the long-haul communication connections.

A polymeric sheath 104, e.g of nylon, is preferably disposed to surround the polymeric matrix 102, in order to avoid the direct contact of this latter with the filling resin material disposed into interstices 105. The resin material according to the invention is disposed in the interstices 105 between the optical core and the metal wires and in the interstices between said metal wires. The filling of said interstices with the resin material can be accomplished for substantially the whole length of the cable or preferably in a discontinuous manner, i.e. a partial filling. Partial filling refers thus to the fact the filling of the interstices is not accomplished for the whole length of the cable.

However, when a longitudinal portion of an interstice is filled with a filling material, said filling material will substantially completely fill the whole radial portion of said interstice, in order to avoid the possible formation of preferential longitudinal paths along which water may flow.

To this end, longitudinal interstices 105 can be filled with a resin material according to the invention for portions of about 20-40 meters length, separated by portions of about 10-30 length substantially free from said filling material. For instance, said interstices can be filled for portions of about 30 meters length with a resin material according to the invention, separated by portions of about 20 meters length free from said material.

The polymeric resin material used for filling the interstices 105 of the cable structure shall be sufficiently soft so as not to negatively affect the signal transmission of optical fibers in case of mechanical stresses produced onto the cable. In particular said polymeric material has a needle penetration higher than about 200 1/10 mm, measured according to ASTM D 5-65, preferably, higher than about 240 1/10 mm.

Said resin material should however preferably have a needle penetration lower than about 400 1/10 mm, in order to effectively oppose to the longitudinal penetration of water along cable's interstices.

As mentioned above, the needle penetration is measured according to the procedure described in ASTM D 5-65, relating to the penetration of bituminous materials. As reported in said standard method of test, the penetration of a material is the distance in tenths of a millimetre that a standard needle penetrates vertically into a sample of the material under fixed conditions of temperature, load and time. The penetration test is thus performed according to said standard, the only difference being the preparation of the material. In fact, while bituminous material are first melted, then poured into a sample container and cooled under controlled conditions, the resin material is poured in the sample container as a liquid curable composition and allowed to cure and solidify for about 24 hours, before proceeding with the measure.

For the purposes of the present invention, in the present description the term "resin" is intended to refer to a solid and compact material obtainable upon curing a suitable curable polymeric composition. Differently from water-blocking filling compositions to be directly contacted with optical fibers (e.g. into a buffer tubes containing said optical fiber), which generally have a grease-like or jelly consistency, a resin filling material may better oppose to the high pressure water flow accidentally penetrated inside the cable.

A resin filling material having the above properties of reduced hardness can be obtained by suitably formulating a polyurethane resin precursor with a predetermined amount of mineral oil, preferably with a limited amount of coupling agent.

The polyurethane resin precursor, i.e. a composition capable of forming a polyurethane resin upon curing, is typically a polyol/polyisocyanate mixture.

A polyurethane resin suitable as filling material according to the present invention typically comprises less than about 35%, preferably from about 10% to about 30% by weight and more preferably from about 15% to about 25%, of a polyol/polyisocyanate mixture, said mixture being preferably comprised of from about 60% to about 85%, more preferably from about 65% to about 80% of a polyol and from about 15% to about 40%, preferably from about 20% to about 35% by weight of a polyisocyanate.

The polyisocyanate can be a polyisocyanate compound which directly reacts with the polyol in the presence of the mineral oil and optionally the coupling agent to form the polyurethane resin. Preferably, the polyisocyanate is a polyisocyanate prepolymer which is in turn prepared by reacting an excess of a polyisocyanate compound with a polyol in a manner well known in the art. The polyisocyanate prepolymer is then reacted with the polyol in the presence of the mineral oil and the coupling agent to form the polyurethane resin.

Examples of such polyisocyanate compounds are 3-isocyanatomethyl 3,5,5-trimethylcyclohexyl isocyanate (IPDI), toluene diisocyanate (TDI), 4,4'-diphenylmethane diisocyanate (MDI), polymethylene polyphenylisocyanate, 1,5-naphthalene diisocyanate, phenylene diisocyanates, 4,4'-methylene bis (cyclohexyl isocyanate) (H.sub.12 MDI), hexamethylene diisocyanate (HMDI), biuret of hexamethylene diisocyanate, 2,2,4 trimethylhexamethylene diisocyanate and combinations thereof.

Preferably, the content of urethane groups (—NCO) in the polyisocyanate prepolymer is from about 5% to about 12% by weight, preferably from about 6 to about 10%. Suitable polyisocyanates and polyisocyanate prepolymers are disclosed in U.S. Pat. No. 4,168,258, herein incorporated by reference.

An example of commercially available polyisocyanate prepolymer is sold under the trademark UREFLEX MU 55 (Michel Baule Chimie, France), which is a solution of polyisocyanate prepolymer (65% w/w) in dioctylpthalate (DOP), having an amount of about 5.5% w/w free urethane groups with respect to the total weight of the mixture, i.e. about 8.5% w/w with respect to the weight of prepolymer.

The polyol which is reacted with the polyisocyanate compound or the polyol which is reacted with the polyisocyanate prepolymer is selected from the group consisting of castor oil, polyether polyols, hydroxyl bearing homopolymers of dienes, hydroxyl bearing copolymers of dienes, and combinations thereof. Although not critical to the formation of the polyurethane, the polyols generally have a number average molecular weight between about 1,000 and about 6,000, preferably between about 1,000 and about 4,000.

Preferably, hydroxyl bearing homopolymers of dienes or hydroxyl bearing copolymers of dienes are employed, hereinafter identified as hydroxylated polydienes. Said hydroxylated polydienes can be prepared from dienes which include unsubstituted, 2-substituted or 2,3-disubstituted 1,3-dienes of up to about 12 carbon atoms. Preferably, the diene has up to about 6 carbon atoms and the substituents in the 2- and/or 3-position may be hydrogen, alkyl, generally lower alkyl, e.g., of about 1 to about 4 carbon atoms, substituted aryl, unsubstituted aryl, halogen, etc. Typical of such dienes are 1,3-butadiene, isoprene, chloroprene, 2-cyano-1,3-butadiene, 2,3-dimethyl-1,3,butadiene, etc. The preferred dienes are 1,3-butadiene and isoprene. Preferably, a hydroxylated polybutadiene is employed, having preferably a molecular weight of from about 2500 to about 3000 Dalton.

A description of suitable hydroxylated polydienes and the preparation thereof is reported in U.S. Pat. No. 3,714,110, the content of which is incorporated by reference.

A suitable commercial hydroxylated polybutadiene is available from Sartomer Company under the trademark POLY-BD.

The polyurethane resin according to the present invention further comprises from about 65% to about 90% by weight, preferably from about 65% to about 85% and more preferably from about 68% to about 80% by weight of a mineral oil. The Applicant has in fact found that this relatively high amount of mineral oil, as compared to the amount used in the polyurethane compositions of the prior art, allows to obtain the desired softness of the resin. In particular, the Applicant has observed that such unusual high amount of mineral oil acts as a plasticizer agent for the polyurethane composition, thus allowing to reduce the relative amount of other conventional plasticizers employed in polyurethanic resin compositions (i.e. ester compounds), which may instead negatively interact with the other polymeric materials of the cable, as explained in the following of this specification.

The mineral oils which may be used in the preparation of the polyurethane filling composition of the present invention include those aliphatic and branched aliphatic saturated hydrocarbons (both known also as paraffinic oils), cycloaliphatic saturated hydrocarbons (also known as naphtenic oils and mixtures thereof, which contain from about 15 to about 30 carbon atoms and which are distilled from petroleum. The terms "mineral oil, paraffinic oil and naphtenic oil", as used herein, are intended in their common industrial meaning, so that said oils may contain also some amounts (typically below 20% by weight) of aromatic hydrocarbons. Preferred hydrocarbon contents of a mineral oil employable in a filling composition according to the invention are from about 35% to about 60% by weight of naphtenic oil, from about 35% to about 50% of paraffinic oil and from about 8% to 18% of an aromatic oil. Preferably, the mineral oil employed in the resin composition according to the invention has a content of at least about 40% by weight of a naphtenic oil. The desired properties of the composition can be advantageously obtained by mixing together two or more mineral oils having different contents and compositions of the above naphtenic, paraffinic and aromatic oils. For instance, two different mineral oils having different viscosity (e.g. about 65 cSt and about 500 cSt) can be added in suitable proportions to the polyurethane curable composition, for adjusting the viscosity of said composition at a value suitable for the application of the same.

Preferably, mixtures of two or more mineral oils having a viscosity of from about 15 cSt to about 800 cSt, preferably from about 50 to about 500 cSt (measured at 20° C., according to ASTM D445) are employed.

Examples of suitable mineral oils which may be employed in a composition according to the present invention are those produced by Nynas Naphthenics (Sweden) under the commercial names NYFLEX or NYTEX.

The composition preferably further comprises less than about 12% by weight of a coupling agent, more preferably less than about 10%, particularly preferred being an amount of less than about 8% by weight. The presence of said coupling agent avoids the occurrence of possible de-mixing phenomena which may take place in the composition before curing, in particular between the polyisocyanate prepolymer and the mineral oil. Preferably, said coupling agent is added in an amount of at lease about 2% by weight, more preferably of at least about 4% by weight.

For the purposes of the present invention, in the present description the term "coupling agent" is referred to a compound or mixture of compounds capable of avoiding the occurrence of the above cited de-mixing phenomena. In particular, such a compound comprises within its molecule at least a polar group (e.g. an ester group), capable of interacting with the polar groups of a polyol and particularly of a polyisocyanate, and at least an hydrophobic portion (e.g. an alkyl chain), capable of interacting with the hydrocarbon components of mineral oils.

Preferred coupling agents are esters compounds, in particular of dicarboxylic acids, preferably di($C_2$-$C_{14}$) alkyl esters of ($C_4$-$C_8$)alkyl or aryl dicarboxylic acids. Particularly preferred are the alkyl esters of adipic acid or preferably o-phtalic acid, such as dioctylphtalate (DOP), dioctyladipate (DOA), diisodecylphtalate or di-2-ethylhexyladipate.

Properties and examples of these and other suitable coupling agents are reported, for instance in U.S. Pat. No. 4,168,258, which is incorporated herein by reference.

As observed by the Applicant, in the absence of the above coupling agent, de-mixing phenomena between mineral oil and polyisocyanate may occur in the composition before curing, with consequent possible non-homogeneity of the reacting system which may result in poor mechanical properties of the final resin.

The Applicant has however observed that the amount of such coupling agent should be limited below about 12% by weight, preferably below 10%, in order to avoid possible negative interactions of these compounds with the polymeric materials forming the optical core or with the polymeric coating materials of the optical fibers.

It has in fact been observed that the presence of relatively high amounts of ester compounds may negatively affect the mechanical properties either of the polymeric material used for manufacturing the optical core of the "tight" type as shown in FIG. 1 (typically made from polyester or polyetherester polymers) or the polymeric material used for coating the optical fibers (typically urethane-acrylate and/or epoxy-acrylate based resins).

In the specific, as observed by the Applicant, if the polyester material of an optical core of the "tight" type is contacted (e.g. as a consequence of possible accidental breaks of the thin polymeric sheath 104 disposed around the optical tight core 102) with a polyurethane curable resin composition having a relatively high amount of ester coupling agent, said coupling agent may disadvantageously permeate into the polyester material of the optical core in an unacceptably high amount, with consequent swelling of said polymeric material. The volume increase of the polymeric material forming the optical core may then result in an attenuation of the transmitted optical signal, due to an uncontrolled compression caused by the swelled material onto the optical fiber. For avoiding these problems, the Applicant has thus determined that the amount of coupling agent in the resin composition comprising the polyurethane components and the mineral oil shall be sufficiently low so that the weight increase of the polymeric material forming the optical core, upon ageing at 85° C. for two weeks in the presence of the cured resin, is preferably less than about 10%.

In addition, the Applicant has also observed that relatively high amount of ester coupling agent in the resin composition may also negatively affect the mechanical properties of the acrylate-based coating of the optical fibers, resulting in particular in a decay of the adhesion properties of the acrylate coating material onto the optical fiber. Also for avoiding this further drawback, the amount of ester coupling agent in the resin composition shall thus be kept relatively low, preferably below 12% by weight.

The polyurethane based filling composition according to the present invention may typically further contain a catalyst, in the amount of from about 5 ppm to about 200 ppm, preferably from about 5 to about 50 ppm. Examples of suitable catalysts are tertiary amines, e.g. triethylamine, or organic salts, particularly those of tin, such as dibutyltin dilaurate.

Further additives may also be added in minor amounts to the composition, such as moisture scavenger defoamers, antioxidants, UV stabilizers, fungicides, biocides, flow agents or thixotropic agents.

The resin of the present invention is preferably formed by admixing a first part (the so-called polyol component) typically comprising a mixture of a polyol, a mineral oil and a catalyst, with a second part (the so-called polyisocyanate component) typically comprising a polyisocyanate prepolymer, a mineral oil and a coupling agent. The two components of the resin are kept separated and are admixed only at the time of the application into cable structure.

The two components polyurethane-based filling composition according to the present invention is generally applied in the liquid state into the desired interstices of the optical cable. For instance, the resin can be applied in the liquid state onto the optical core and/or onto the steel wires forming the armoring of the cable, while these latter are being stranded around the optical core during the manufacturing of the cable, in order to completely fill said interstices.

Once mixed, the uncured two component resin shall preferably have a viscosity relatively low so as to easily penetrate inside the interstices to be filled with the uncured resin, but sufficiently high so as to avoid the dripping of the uncured filling composition out of the cable structure during the manufacturing process.

The viscosity of the curable polyurethane composition being applied in the interstices of the cable shall thus preferably be lower than about 800 cSt, more preferably lower than about 450 cSt (measured at 25° C. according to ASTM D445, with a Cannon Feske viscometer after about one minute from the mixing of the components forming the resin), in order to allow an easy application of the resin in the longitudinal interstices of the optical cable. The viscosity of the uncured composition shall preferably be higher than about 150 cSt, more preferably higher than about 250 cSt, for avoiding dripping of the composition during application.

In addition, the resin should preferably have a relatively high gel time, in order to allow possible interruptions in the manufacturing process of the cable, without incurring the risk of possible gelation of the resin inside the injectors of the bi-component resin. The gel time of the resin is thus preferably higher than about 8 hours, more preferably comprised from about 10 h and about 20 h (measured according to ASTM 4473). Further physical parameters which shall preferably be kept under control for a filling material according to the present invention are the cross-linking shrinkage, i.e. the percentage of volume shrinkage when the liquid composition is cured into the solid resin. A relatively low volume reduction (from the liquid to the cured resin) avoids the formation of undesired voids inside the filling material, thus creating an effective barrier of polymeric material against the longitudinal flow of water accidentally penetrating inside the cable structure. Preferably, said curing shrinkage is thus lower than about 0.5%.

Furthermore, the polyurethane resin according to the present invention shall preferably evolve limited amounts of gases (such as hydrogen and carbon dioxide, for instance) upon ageing. As known, the presence of even small amounts of hydrogen in hermetic cables may cause severe problems on the optical fibers, with unacceptable increase in the attenuation of the transmitted signal. On the other side, the amount of carbon dioxide is not so critical. However, if relatively high amounts of carbon dioxide are developed inside an hermetic cable, local overpressure of the same may also cause an attenuation in the transmitted signal, due to a mechanical compression of the optical fibers.

A resin according to the present invention evolves less than about 0.6 $ncm^3/kg$ of hydrogen after aging of the resin for 15 days at 100° C., more preferably less than about 0.5 $ncm^3/kg$. In addition, a resin according to the present invention evolves less than about 150 $ncm^3/kg$ of carbon dioxide after aging of the resin for 15 days at 100° C., more preferably less than about 90 $ncm^3/kg$.

The Applicant has observed that the evolution of carbon dioxide of a resin according to the invention is relatively low with respect to commercial resin containing rather high amounts of ester components. This is probably due to the rather high hydrophilicity of the ester compounds, which may cause a relevant absorption of water into the uncured composition, if said composition is not preserved from contact with humidity. Said water may then react with the isocyanic groups of the polyisocyanate, thus evolving carbon dioxide. If substantial amounts of said evolved carbon dioxide remain trapped into the cured resin, said gas may then be slowly released inside the hermetic structure of the cable, upon ageing of this latter, thus possibly causing undesirable local overpressure.

Although the cable of the invention has been described with specific reference to a cable comprising an optical core of the tight type, it may be appreciated by those skilled in the art that a filling resin composition according to the invention can be advantageously used for filling also submarine cables comprising other types of optical cores, such as an optical core comprising a single buffer tube centrally disposed within said cable and loosely housing a plurality of optical fibers therein, or an optical core comprising a plurality of buffer tubes stranded around a central strength member each of said buffer tubes housing a plurality of optical fibers therein.

The following examples will illustrate the invention in more detail.

EXAMPLE 1

Preparation of a Filling Composition According to the Invention

A liquid polyurethane resin to be filled into the voids of an optical fiber submarine cable according to the present invention has been prepared as follows.

148 g of Poly Bd R 45 HT (hydroxylated polybutadiene with a number average molecular weight of 2,800 and a concentration of hydroxy groups of 0.83 meq/g, produced by Elf Atochem, France) were added at room temperature to 537 g of Nytex 810 (a mineral process oil having a viscosity of 65 cSt at 20° C., commercialized by Nynas Naphtenics, Sweden), 202 g of Nytex 820 (a mineral process oil having a viscosity of 500 cSt at 20° C.), 30 g of dioctylphtalate (DOP), and 0.010 g of dibutyltin dilaurate; the mixture was stirred until homogeneity.

Thereafter, 83 g of Ureflex MU55 (Michel Baule Chimie, France), i.e. a solution of 65% w/w of a 4,4'-diphenylmethane diisocyanate (MDI) based polyisocyanate premolyer in 35% of DOP, having a total content of 5.5% of free isocyanate groups, was added under stirring and the whole mixture was left to stand for 24 hours at room temperature, before determining the relative softness.

EXAMPLE 2

Determination of the Softness of the Polyurethane Resin Composition

The softness of the polyurethane resin prepared according to Example 1 has been determined by the needle penetration test according to standard ASTM D5-65, the only difference with respect to said test being the preparation of the material to be tested. Thus; after the addition of the polyisocyanate component, the liquid curable composition of example 1 is poured in the sample container and allowed to cure and solidify for about 24 hours. The measurement of the softness is then accomplished according to the above standard.

A value of 260 1/10 mm has been measured for the resin prepared according to Example 1.

The same test has been performed on a commercial two-components resin typically employed for filling the interstices in submarine optical cables, having an amount of plasticizer agent (palmitate ester) higher than 50% w/w (about 70%). A value of 110 1/10 mm has been measured for this commercial resin.

EXAMPLE 3

Compatibility of the Resin Filling Material with the Polymeric Material of the Cable Core In order to evaluate the compatibility of the liquid polyurethane composition with the materials forming the optical core, test pieces of the material forming the optical core were immersed into polyurethane liquid compositions with different amounts of DOP coupling agent, which compositions were then cured and aged.

Hytrel 3548 L (a thermoplastic elastomer polyetherester sold by DU PONT) was used as the reference material forming the tight optical core, for producing specimens of 2 m length and 2.76 mm diameter.

The weight of each specimen has been measured and the specimens were then immersed into different liquid polyurethane based compositions which were then cured. The tested polyurethane compositions were comprised of 17.5 parts by weight of polyurethane resin precursors (with a polyol/polyisocyanate ratio as in Example 1), 82.5 parts of mineral oil (Nytex 810), 10 ppm of dibutyltin laurate as catalyst and DOP as coupling agent in variable relative amounts, as indicated in table 1. The specimens were thus immersed into the liquid resin composition, which has been cured and aged for 15 days at 85° C.

At the end of the test, the specimens were extracted from the resin and their weight was determined.

The following table 1 lists the result of these tests.

TABLE 1

| Weight increase of polymeric optical core upon ageing at 85° C. for two weeks | | |
|---|---|---|
| MO:DOP ratio | PU:MO:DOP ratio | Weight increase % |
| 97:3 | 17.5:8.0:2.5 | 7 |
| 93:7 | 17.5:77:5.5 | 8 |
| 87:13 | 17.5:72:10.5 | 10 |
| 73:27 | 17.5:60:22.5 | 14 |
| 68:32 | 17.5:56:26.5 | 16 |

TABLE 1-continued

Weight increase of polymeric optical core
upon ageing at 85° C. for two weeks

| MO:DOP ratio | PU:MO:DOP ratio | Weight increase % |
|---|---|---|
| 48:52 | 17.5:40:42.5 | 22 |
| 24:76 | 17.5:20:62.5 | 30 |

MO = mineral oil
DOP = dioctylphtalate
PU = polyurethane resin

As shown by the above table, an amount DOP coupling agent slightly higher than about 10% may cause an increase of about 10% in the weight of the polymeric material forming the optical core.

EXAMPLE 4

Compatibility of the Coating Acrylate Material of Optical Fibers with the Polyurethane Resin Composition An optical core of the "tight" type, having a diameter of 2.76 mm and containing four optical fibers has been manufactured, using Hytrel 3548L as the polymeric material for embedding the optical fibers. The optical fibers were commercial LEA fibers with acrylate coating.

Four specimens of the above optical core (two meter length each) were immersed into a polyurethane liquid compositions prepared according to Example 1 and four into specimen were immersed into the commercial polyurethane resin of Example 2.

The resins have been cured and aged at 85° C. into a ventilated oven for one month.

At the end of the ageing, the fibers were extracted from the optical core and the pull out force of the acrylate coating of each fiber was determined.

As a reference, the pull out force has been measured also on the optical fibers embedded into four different specimens of non-aged tight optical core.

The pull out force of the acrylate coating of the optical fibers is measured as follow.

One end of the optical fiber is adhesively fixed to a movable clamp and the other end of the fiber is fixed to fixed clamp connected to a load cell. The acrylate coating is cut along its whole circumference (for a thickness corresponding to the thickness of the acrylate coating) in the proximity of the movable clamp, to create a discontinuity in the coating. The movable clamp is then moved away from the fixed clamp at a constant speed of about 1 cm/min and the pull out force (expressed in g/cm) for separating the acrylate coating from the glass portion of the fiber is measured.

The following tables 2a-2c show the results of the test made on the four specimens in the three different conditions.

TABLE 2a

Pull out force of optical fiber in a non-aged optical core

| Fibre | Pull out force (g/cm) | | | | |
|---|---|---|---|---|---|
| | Spec. 1 | Spec. 2 | Spec. 3 | Spec. 4 | Average |
| Orange | 1260 | 1225 | 1325 | 1298 | 1275 |
| Brown | 945 | 900 | 855 | 1060 | 940 |
| Yellow | 1170 | 1105 | 1160 | 1090 | 1131 |
| Black | 800 | 1020 | 950 | 1040 | 952 |

TABLE 2b

Pull out force of optical fiber in an optical core aged
in the presence of the polyurethane composition of Example 1

| Fibre | Pull out force (g/cm) | | | | |
|---|---|---|---|---|---|
| | Spec. 1 | Spec. 2 | Spec. 3 | Spec. 4 | Average |
| Orange | 850 | 910 | 1075 | 1195 | 1010 |
| Brown | 905 | 1065 | 980 | 1100 | 1012 |
| Yellow | 925 | 990 | 910 | 1070 | 973 |
| Black | 785 | 810 | 1020 | 1035 | 912 |

TABLE 2c

Pull out force of optical fibers in an optical core aged
in the presence of a commercial polyurethane composition

| Fibre | Pull out force (g/cm) | | | | |
|---|---|---|---|---|---|
| | Spec. 1 | Spec. 2 | Spec. 3 | Spec. 4 | Average |
| Orange | 750 | 400 | 335 | 630 | 528 |
| Brown | 735 | 700 | 200 | 450 | 521 |
| Yellow | 865 | 650 | 540 | 515 | 642 |
| Black | 530 | 415 | 480 | 585 | 502 |

As apparent from the above tables, the average value of the pull out force of optical fibers in an optical core aged in the presence of a polyurethane composition according to the present invention is substantially the same as the pull out force of non-aged optical fibers. On the other side, the pull out force of optical fibers in an optical core aged in the presence of a commercial polyurethane filling composition are clearly lower, thus indicating possible negative impacts of this kind of filling compositions on the mechanical properties of the optical fibers.

The invention claimed is:

1. An optical cable comprising:
   an outer sheath;
   an optical core disposed within said outer sheath, said optical core comprising at least one optical fiber housed therein; and
   at least one longitudinal cavity disposed along and in contact with said optical core;
   wherein said at least one longitudinal cavity is at least partially filled with a resin material having a needle penetration higher than about 200 1/10 mm, measured according to ASTM D 5-65,
   wherein said resin material is obtained from a liquid curable composition comprising a polyol/polyisocyanate mixture, mineral oil, and an ester coupling agent in an amount greater than about 2% by weight and less than about 12% by weight.

2. The optical cable according to claim 1, wherein said resin material has a needle penetration higher than about 240 1/10 mm.

3. The optical cable according to claim 1, wherein said resin is a polyurethane-based resin.

4. The optical cable according to claim 1, wherein said optical core comprises at least one optical fiber embedded into a matrix of polymeric material.

5. An optical cable comprising:
   an outer sheath;
   an optical core disposed within said outer sheath, said optical core comprising at least one optical fiber housed therein;
   at least one longitudinal cavity disposed along and in contact with said optical core;

wherein said at least one longitudinal cavity is at least partially filled with a polyurethane resin obtainable from a liquid curable composition comprising less than about 35% by weight of a polyol/polyisocyanate mixture and about 65% to about 90% by weight of a mineral oil, wherein said liquid curable composition further comprises an ester coupling agent in an amount greater than about 2% by weight and less than about 12% by weight.

6. The optical cable according to claim 5, wherein the amount of the polyol/polyisocyanate mixture in said liquid curable composition is about 15% to about 25%.

7. The optical cable according to claim 5, wherein the amount of the polyol/polyisocyanate mixture in said liquid curable composition is about 10% to about 30% by weight.

8. The optical cable according to claim 7, wherein said polyol/polyisocyanate mixture comprises about 60% to about 85% of a polyol and about 15% to about 40% by weight of a polyisocyanate.

9. The optical cable according to claim 7, wherein said polyol/polyisocyanate mixtures comprises about 65% to about 80% of a polyol and about 20% to about 35% by weight of a polyisocyanate.

10. The optical cable according to claim 5, wherein said amount of mineral oil in said liquid curable composition is about 65% to about 85%.

11. The optical cable according to claim 5, wherein said amount of mineral oil in said liquid curable composition is about 68% to about 80% by weight.

12. The optical cable according to claim 5, wherein said ester coupling agent is an ester of a dicarboxylic acid.

* * * * *

UNITED STATES PATENT AND TRADEMARK OFFICE
CERTIFICATE OF CORRECTION

PATENT NO. : 7,386,208 B2  
APPLICATION NO. : 10/451952  
DATED : June 10, 2008  
INVENTOR(S) : Bosisio et al.

It is certified that error appears in the above-identified patent and that said Letters Patent is hereby corrected as shown below:

\*On the title page, item (75), line 1, "Brembata" should read --Brembate--.

\*On the title page, item (75), line 2, "Massimillano" should read --Massimiliano--.

In claim 9, column 14, line 4, "mixtures" should read --mixture--.

Signed and Sealed this

Eighteenth Day of November, 2008

JON W. DUDAS  
*Director of the United States Patent and Trademark Office*